2,946,678

METALLIC COMPOSITION

Lawrence V. La Rou, Detroit, Mich., assignor to Wall Colmonoy Corporation, Detroit, Mich., a corporation of New York No Drawing. Filed Sept. 28, 1956, Ser. No. 612,591

6 Claims. (Cl. 75—134)

This application is a continuation in-part of the applicant's copending application, Serial No. 410,701, filed February 16, 1954, now abandoned, for Metallic Composition.

This invention relates to metallic compositions and more particularly to an improved alloy which may be used for purposes of controlling a nuclear reactor such as, for example, a nuclear reactor of the type disclosed in Patent 2,708,656, issued May 17, 1955, to Enrico Fermi and Leo Szilard.

In controlling a nuclear reactor such as a nuclear reactor of the type disclosed in the above-mentioned patent, it has been found desirable to employ control rods for the purpose of absorbing neutrons. Such control rods are inserted in the nuclear reactor and selectively positioned so as to absorb neutrons at the desired rate. However, prior materials which have a high cross section ratio of absorption of neutrons and which have been used for control rods have been subject to the defect that they have a relatively low melting point and low oxidation resistance. In an effort to overcome these disadvantages, prior alloys having a high boron content have been proposed. However, such alloys have been subject to the defect that they are difficult to machine to close tolerances and are brittle, thereby making it difficult to handle the rods without excessive breakage.

An object of the present invention is to overcome disadvantages in prior materials of the indicated character and to provide an improved alloy particularly adapted to form control rods which may be utilized in controlling a nuclear reactor.

Another object of the invention is to provide an improved alloy which has a high cross section ratio of absorption of neutrons and which has a relatively short half-life.

Another object of the invention is to provide an improved alloy which has a relatively high melting point; which has a high degree of oxidation resistance at elevated temperatures; and which has a high resistance to growth on repeated heating and cooling.

Still another object of the invention is to provide an improved alloy of the indicated character that may be machined to relatively close tolerances with a minimum of time, labor and expense; which is relatively ductile and shock resistant; and which may be melted in conventional furnaces and cast in conventional molds with a minimum of expense.

Other objects, advantages and features of the present invention will be specifically pointed out or will become apparent upon consideration of the present disclosure in its entirety.

In accordance with the present invention, the above objects are obtained and the difficulties mentioned are avoided when an alloy is prepared containing as essential constituents certain proportions of boron, certain proportions of at least one metal selected from the group consisting of chromium and nickel, and certain proportions of copper. The alloy obtained has novel properties particularly useful for controlling a nuclear reactor, although it will be understood that the present invention is applicable to other uses.

This invention broadly contemplates an alloy containing 5-20% boron, 25-79% of at least one metal selected from the group consisting of chromium and nickel, and the remainder copper. With the amounts of boron stated, the alloy has a relatively high melting point, a high cross section ratio of absorption of neutrons and at the same time a relatively short half-life. Control rods having this combination of a high melting point, a high cross section ratio of absorption of neutrons and a relatively short half-life may be advantageously employed in nuclear reactors which operate more efficiently at relatively high operating temperatures.

It has also been found that with the stated amounts of nickel and/or chromium and copper, the alloy of the present invention has a high degree of oxidation resistance at the elevated temperatures which may be present in a nuclear reactor and that control rods made therefrom have a minimum tendency to grow upon repetitive heating and cooling. Furthermore, the alloy is ductile and shock resistant; may be ground or machined to close tolerances with conventional machine tools; and may be melted in a conventional furnace and cast in conventional molds.

According to the present invention, there are at least two alloys which may be used for control rods for nuclear reactors, the first alloy having approximately the following composition:

| | Percent |
|---|---|
| Boron | 5–20 |
| Nickel | 25–79 |
| Copper | The remainder |

While suitable quantities of boron and nickel in a relatively pure, refined state may be utilized in preparing the above alloy, it is preferred to utilize commercially available alloys of nickel boron as the source of both the boron and the nickel. In preparing the above alloy, the desired proportions of the alloy of nickel boron and the copper may be placed in a furnace and heated to temperatures in the range from 2800° F. to 3000° F. When the composition has reached the desired temperature, a calcium silicide deoxidizer may be added to the melt for degasification purposes after which the alloy may be poured into conventional molds of the desired configuration. However, the methods of preparation of the alloys of the present invention are not limited to the above.

The second alloy has approximately the following composition:

| | Percent |
|---|---|
| Boron | 5–20 |
| Chromium | 25–79 |
| Copper | The remainder |

While suitable quantities of boron and chromium in a relatively pure, refined state may be utilized in preparing this last-mentioned alloy, it is preferred to utilize chromium boride as the source of both the boron and the chromium.

The invention is illustrated in greater detail by the following specific compositions, given by way of example only.

Example 1

| | Percent |
|---|---|
| Boron | 10 |
| Nickel | 59 |
| Copper | 31 |

Example 2

| | Percent |
|---|---|
| Boron | 10 |
| Chromium | 45 |
| Copper | 45 |

With the stated amounts of boron present, both of the alloys given by way of example have a relatively high cross section ratio of absorption of neutrons and produce isotopes having relatively short half-lives. The nickel, chromium, and copper each have a relatively low cross section ratio of absorption of neutrons, produce isotopes having relatively short half-lives, and function to provide the other desirable properties mentioned hereinbefore.

What is claimed is:

1. An alloy having substantially the composition 5 to 20% boron, 25 to 79% of one metal selected from the group consisting of chromium and nickel, and the remainder copper.

2. An alloy having substantially the composition 5 to 20% boron, 25 to 79% nickel, and the remainder copper.

3. An alloy having substantially the composition 5 to 20% boron, 25 to 79% chromium, and the remainder copper.

4. A control rod for a nuclear reactor having substantially the composition 5 to 20% boron, 25 to 79% of one metal selected from the group consisting of chromium and nickel, and the remainder copper.

5. A control rod for a nuclear reactor having substantially the composition 5 to 20% boron, 25 to 79% nickel, and the remainder copper.

6. A control rod for a nuclear reactor having substantially the composition 5 to 20% boron, 25 to 79% chromium, and the remainder copper.

References Cited in the file of this patent

UNITED STATES PATENTS

| | | |
|---|---|---|
| 570,014 | Hall | Oct. 27, 1896 |
| 1,115,238 | Parr | Oct. 27, 1914 |
| 1,203,555 | Brix | Oct. 31, 1916 |
| 1,350,166 | Milliken | Aug. 17, 1920 |
| 1,614,878 | Cochrane | Jan. 18, 1927 |

OTHER REFERENCES

Nucleonics, vol. 11, No. 6, June 1952, pub. by McGraw-Hill Pub. Co., Inc., New York, page 39.